United States Patent [19]
Kiest, Jr.

[11] Patent Number: 5,964,249
[45] Date of Patent: *Oct. 12, 1999

[54] APPARATUS AND METHOD FOR REPAIRING A PIPELINE

[75] Inventor: Larry W. Kiest, Jr., Ottawa, Ill.

[73] Assignee: LMK Enterprises, Inc., Ottawa, Ill.

[*] Notice: This patent is subject to a terminal disclaimer.

[21] Appl. No.: 08/924,158

[22] Filed: Sep. 5, 1997

Related U.S. Application Data

[63] Continuation-in-part of application No. 08/622,817, Mar. 27, 1996, Pat. No. 5,765,597.

[51] Int. Cl.⁶ ..................................................... F16L 55/16
[52] U.S. Cl. ............................. 138/98; 138/97; 156/294; 264/269; 264/516
[58] Field of Search ................. 138/98, 97; 264/269, 264/516, 36, 572, 573; 156/287, 294, 94, 156

[56] References Cited

U.S. PATENT DOCUMENTS

| | | | |
|---|---|---|---|
| 2,794,758 | 6/1957 | Harper et al. | 156/286 |
| 3,230,129 | 1/1966 | Kelly | 156/287 |
| 3,494,813 | 2/1970 | Lawrence et al. | 156/287 |
| 3,560,295 | 2/1971 | Kimbrell et al. | 156/287 |

(List continued on next page.)

FOREIGN PATENT DOCUMENTS

| | | |
|---|---|---|
| 1194264 | 1/1985 | Canada . |
| 241719 | 10/1987 | European Pat. Off. . |
| 518521 | 12/1992 | European Pat. Off. . |
| 518521A2 | 12/1992 | European Pat. Off. . |
| 5534969 | 3/1980 | Japan . |
| 618503 | 6/1976 | U.S.S.R. . |
| 618503 | 8/1978 | U.S.S.R. . |
| 1553408 | 9/1979 | United Kingdom . |
| 2018384 | 10/1979 | United Kingdom . |
| 2042673 | 9/1980 | United Kingdom . |
| 1580438 | 12/1980 | United Kingdom . |
| 1340068 | 12/1993 | United Kingdom . |
| 2273755 | 6/1994 | United Kingdom . |
| 8908218 | 9/1989 | WIPO . |
| WO16320 | 8/1993 | WIPO . |

OTHER PUBLICATIONS

Insituform (1985) Illustrates installation of a sewer pipe liner by the inversion method using a seamed, resin–impregnated liner.
NuPipe (Civil Engineering Magazine 1993) explains the installation method of a softened PVC pipe liner.
PALTEM Portable Water Hose Lining Method describes a pipe liner installation method using a guide belt (no date available).
PALTEM Sewer Hose Lining Method decribes a compressed air inversion method of pipe lining (no date available).

*Primary Examiner*—Patrick Brinson
*Attorney, Agent, or Firm*—Zarley, McKee, Thomite, Voorhees & Sease

[57] ABSTRACT

An apparatus for repairing a pipeline includes an elongated flexible tube with one end inverted upon itself to create an outer inverted portion and an inner non-inverted portion connected at an inversion end. An elongated sleeve-shaped liner impregnated with rosin is fitted within the non-inverted portion of the tube member in contact with the interior surface thereof. A plurality of attachment strips are frangible connected at one end to the liner, and permanently affixed to the tube inner surface, such that inversion of the tube member will cause the attachment strips to invert to the exterior of the inverted portion, and thereby also invert the liner to the exterior surface of the inverted portion of the tube.

15 Claims, 6 Drawing Sheets

U.S. PATENT DOCUMENTS

| | | | |
|---|---|---|---|
| 3,914,825 | 10/1975 | Reynolds | 24/115 R |
| 3,976,578 | 8/1976 | Beane | 210/484 |
| 4,064,211 | 12/1977 | Wood | 264/516 |
| 4,167,358 | 9/1979 | Besha | 405/87 |
| 4,207,130 | 6/1980 | Barber | 156/244.13 |
| 4,284,507 | 8/1981 | Beane | 210/435 |
| 4,288,321 | 9/1981 | Beane | 210/170 |
| 4,322,232 | 3/1982 | Beane | 55/360 |
| 4,334,943 | 6/1982 | Zenbayashi et al. | 156/287 |
| 4,350,548 | 9/1982 | Zenbayashi et al. | 156/156 |
| 4,366,012 | 12/1982 | Wood | 156/93 |
| 4,368,091 | 1/1983 | Ontsuga et al. | 138/98 X |
| 4,427,480 | 1/1984 | Kamura et al. | 156/287 |
| 4,576,205 | 3/1986 | Morinaga et al. | 138/98 |
| 4,581,247 | 4/1986 | Wood | 427/508 |
| 4,600,615 | 7/1986 | Hyodo et al. | 138/125 |
| 4,685,983 | 8/1987 | Long | 156/423 |
| 4,752,511 | 6/1988 | Driver | 138/97 X |
| 4,778,553 | 10/1988 | Wood | 156/287 |
| 4,836,715 | 6/1989 | Wood | 138/98 X |
| 4,865,673 | 9/1989 | Shishkin et al. | 138/98 X |
| 4,867,921 | 9/1989 | Steketee, Jr. | 264/36 |
| 4,871,413 | 10/1989 | Hyodo et al. | 156/382 |
| 4,954,016 | 9/1990 | Storgard | 405/184 |
| 4,985,196 | 1/1991 | LeDoux et al. | 264/516 |
| 4,995,761 | 2/1991 | Barton | 138/98 X |
| 5,044,405 | 9/1991 | Driver et al. | 138/98 |
| 5,108,533 | 4/1992 | Long et al | 156/423 |
| 5,280,811 | 1/1994 | Catallo et al. | 138/98 |
| 5,322,653 | 6/1994 | Muller | 138/98 |
| 5,329,063 | 7/1994 | Endoh | 138/98 |
| 5,358,359 | 10/1994 | Long | 405/154 |
| 5,388,616 | 2/1995 | Muller et al. | 138/98 |
| 5,393,481 | 2/1995 | Wood | 264/269 |
| 5,501,248 | 3/1996 | Kiest | 156/287 |
| 5,549,856 | 8/1996 | Yokoshima | 138/98 X |
| 5,628,345 | 5/1997 | Fisco | 138/98 |

APPARATUS AND METHOD FOR REPAIRING A PIPELINE

CROSS-REFERENCE TO RELATED APPLICATION

This is a continuation-in-part application of application Ser. No. 08/622,817 filed Mar. 27, 1996 now U.S. Pat. No. 5,765,597, entitled APPARATUS FOR REPAIRING A PIPELINE AND METHOD FOR USING THE SAME.

TECHNICAL FIELD

The present invention relates generally to resin impregnated liners for repair of pipelines, and more particularly to an improved method and apparatus for installing the liner at a desired location within a pipeline.

BACKGROUND OF THE INVENTION

One method of repairing damaged sewer pipe is to excavate the area surrounding the sewer pipe and replace the broken portion. This is a very expensive and a labor intensive solution and is also an inconvenience to residents living in the area and utilizing roadways overlying the area.

Another solution is In situ relining of sewer pipes. In situ methods typically utilize a resin coated liner which is inserted into the existing sewer pipeline and unrolled against the sewer pipe. The unrolled liner is held against the existing sewer pipe while the resin cures to form a new pipe lining within the existing pipe.

One example of such a method is shown in U.S. Pat. No. 4,366,012. In this patent, a process for installing a liner in a sewer pipe is disclosed which utilizes an elongated tube of felt coated on the exterior with urethene to form an "outer" tube. Because the felt tube is coated with this material, the two tubes act as a single integral laminated tube—with a urethane outer layer and a felt inner layer. Uncured resin is introduced into the tube and is used to impregnate the felt layer of the tube. The tube is then inverted into the end of a sewer pipe so that the impregnated felt layer is inverted to the outside and the urethane layer is located on the interior. The inversion process continues until the area of the sewer pipe needing repair has been contacted by the impregnated felt layer of the tube. When the resin cures, a pipe liner is formed by the inverted tube.

The applicant's co-pending patent application shows a method for impregnating a curable resin in a layer of resin absorbent material located within an elongated flexible bladder tube having a fill end and a vacuum end positioned down stream from the fill end. The bladder tube includes two walls forming a tube cavity therein. The layer of resin absorbent material has a down stream end positioned a predetermined distance from the vacuum end of the bladder tube, and an upstream end. An elongated gas conduit having first and second conduit ends is placed within the tube cavity with the first conduit end positioned up stream from the down stream of the resin absorbent material and with the second conduit end positioned down stream from the down stream end of the resin absorbent material.

A quantity of curable resin is then introduced into the fill end of the bladder tube, the quantity of resin being sufficient to impregnate all of the resin absorbent material within the bladder tube. A vacuum source is then connected to the bladder tube at a point spaced down stream from the down stream end of the resin absorbent material whereby the wall of the bladder tube will collapse on the layer of resin absorbent material and the gas conduit will provide a path for evaluating gas through the collapsed two walls. Gas is continuously evacuated from the bladder tube until the curable resin moves to the down stream end of the absorbent material and completely impregnates the absorbent material.

As described in detail in the co-pending '817 application, the repair sleeve is attached at its forward end to an inversion collar by means of stitches. The forward end of the inversion collar is then affixed to the forward end of the bladder tube by heat sealing, adhesive, or other suitable securement. In this way, as the bladder tube is inverted, the inversion collar will also be inverted so as to be positioned on the outside of the bladder after the inversion. Similarly, the stitches connecting the inversion collar to the repair sleeve will also cause the repair sleeve to invert, so as to be positioned on the outside of the bladder tube in contact with the portion of the pipeline to be repaired.

While the inversion collar described in the co-pending '817 application serves its purposes, it has been found that there are several drawbacks to a continuous collar connecting the bladder tube to the repair sleeve. First, the use of a continuous collar adds an additional layer of material to the bladder tube. This additional layer resists expansion when the bladder tube is pressurized to radially expand and maintain the repair sleeve in position during curing of the resin.

A second problem with the use of a continuous collar to invert the felt liner is that the collar encapsulates a portion of the liner between the collar and bladder thereby making it difficult to impregnate that portion with resin.

Obviously, the cost of material is greater with a continuous collar than with the attachment strips described herein. The strips of the present invention may be made from scrap from the manufacture of the bladder, resulting in a lower overall cost.

Another deficiency in the prior art method for inverting the repair sleeve resides in the pressures required to invert a continuous sleeve in addition to the pressure required to invert the bladder tube and repair sleeve. High pressures during the inversion process can squeeze the resin out of the repair sleeve liner, thereby decreasing the strength and durability of the repair. It is therefore desirable to decrease the amount of pressure required to complete the inversion process, as much as possible.

Another problem with prior art methods for repairing pipelines is present in pipelines of small diameter such as in laterals, wyes, and in pipelines which change diameter along their lengths. Previously, it was necessary to begin a liner at the entrance to the pipeline to be repaired, and continue the repair sleeve liner a distance to reach the repair site. If the repair site is located a great distance from the pipeline entrance, there is a great quantity of wasted material, as well as increased labor costs.

SUMMARY OF THE INVENTION

It is therefore a general object of the present invention to provide an improved apparatus for inverting a repair sleeve liner within a pipeline to repair the pipeline.

Another object is to provide an apparatus for installing a repair sleeve liner within a pipeline which reduces the necessary pressure for inverting the liner and carrier tube within the pipeline, as compared to prior art apparatus.

Still another object of the present invention is to provide an improved apparatus and method for installing a repair sleeve liner through a clean out, and begin the liner after a tee or wye fitting.

A further object of the present invention is to provide a method and apparatus for installing a repair sleeve liner in a lateral through a small diameter pipe which changes to a larger diameter pipe, while beginning the liner at the beginning of the large diameter pipe.

These and other objects of the present invention will be apparent to those skilled in the art.

The apparatus for repairing a pipeline of the present invention includes an elongated flexible tube with one end inverted upon itself to create an outer inverted portion and an inner non-inverted portion connected at an inversion end. An elongated sleeve-shaped liner impregnated with rosin is fitted within the non-inverted portion of the tube member in contact with the interior surface thereof. A plurality of attachment strips are frangibly connected at one end to the liner, and permanently affixed to the tube inner surface, such that inversion of the tube member will cause the attachment strips to invert to the exterior of the inverted portion, and thereby also invert the liner to the exterior surface of the inverted portion of the tube.

DESCRIPTION OF THE PREFERRED EMBODIMENT

Figure 1:
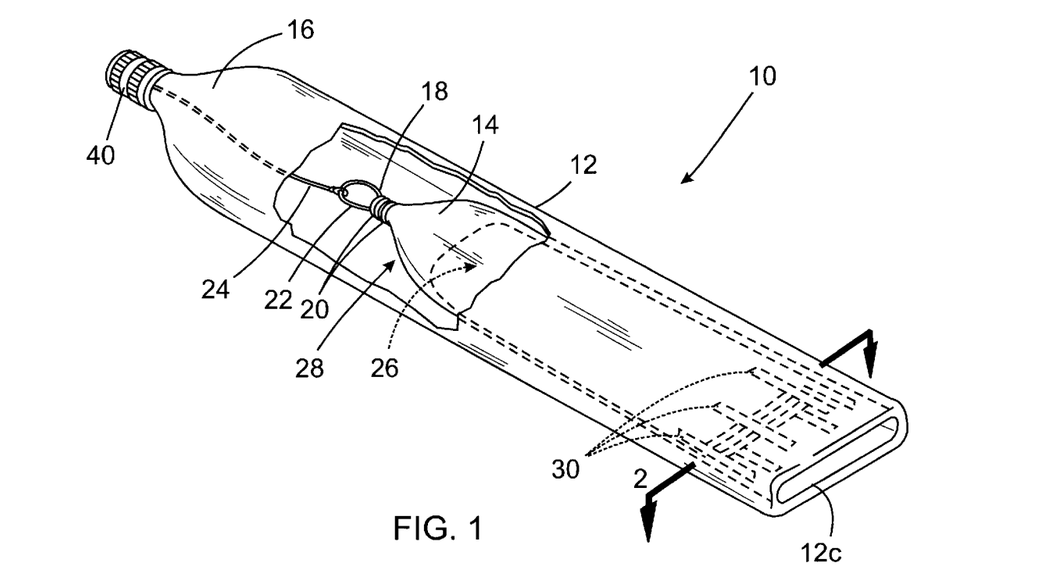
FIG. 1 is a perspective view of the liner/bladder assembly of the present invention.

Referring now to the drawings, in which similar or corresponding parts are identified with the same reference numeral and more particularly to FIG. 1, the liner/bladder assembly of the present invention is designed generally at 10 and includes a bladder tube 12 having a rearward end 14 and a forward end 16. Fitted within the rearward end 14 of bladder tube 12 is a threaded receptacle 18 which is held in place by means of clamps 20. A pulling loop 22 is also held by clamps 20 and is attached to control line 24. Within bladder tube 12 is a repair sleeve liner 26, formed of felt or other resin-absorbent material. As shown in FIG. 1, bladder tube 12 has the forward end 16 reversed and inverted upon itself to form an inverted portion 12a with a cavity 28, within which the non-inverted portion 12b is located.

Figure 2:
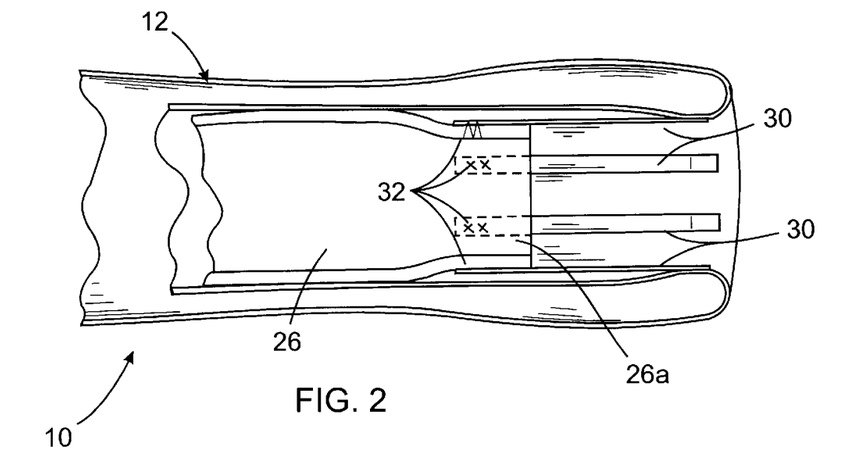
FIG. 2 is an enlarged sectional view taken at lines 2—2 in FIG. 1.
Figure 3:
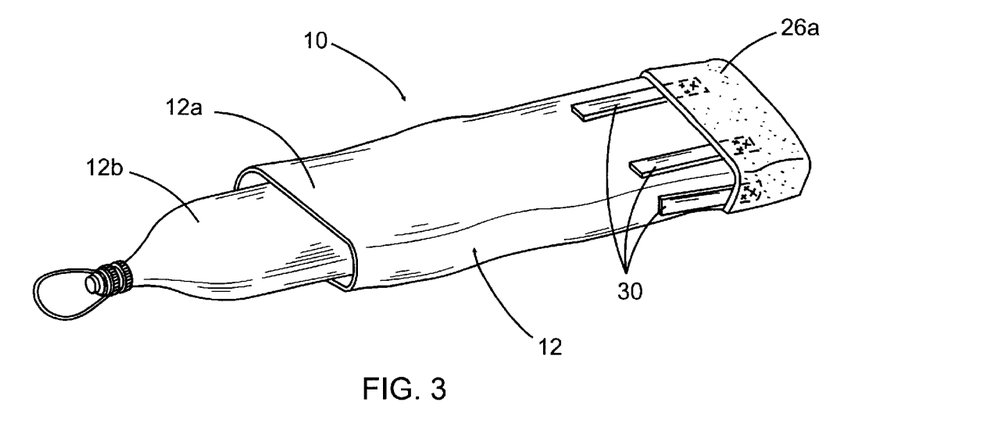
FIG. 3 is a perspective view of a portion of the liner/bladder assembly, inverted to show the attachment strips and the portion of the liner.

Referring now to FIGS. 2 and 3, liner 26 has a plurality of attachment strips 30 secured to its leading end 26a by stitches 32. The forward ends of attachment strips 30 are affixed to the interior surface of bladder tube 12 (shown on the exterior of inverted portion 12a in FIG. 3) by heat sealing, adhesive, or other permanent attachment means. Stitches 32 are easily broken away so as to permit the leading end 26a of liner 26 to be separated from the rearward end of attachment strips 30 and the bladder tube 12, by use of a dynamic tension force.

The method of impregnating the repair sleeve liner 26 with resin is set forth in detail in the applicant's co-pending '817 application, and the contents of that application are incorporated herein by reference thereto. As shown in FIGS. 2–3, attachment strips 30 are generally parallel to one another and uniformly spaced apart, such that inversion of bladder tube 12 will cause attachment strips 30 to invert from the interior of assembly 10 to the exterior thereof, thereby pulling the forward end 26a of liner 26 to an inverted position on the exterior of the inverted portion 12a of bladder tube 12. The use of spaced apart strips 32 reduces the force required to invert the strips, as compared to the forces required to invert a continuous sleeve, as was used in co-pending '817 application.

Figure 4:
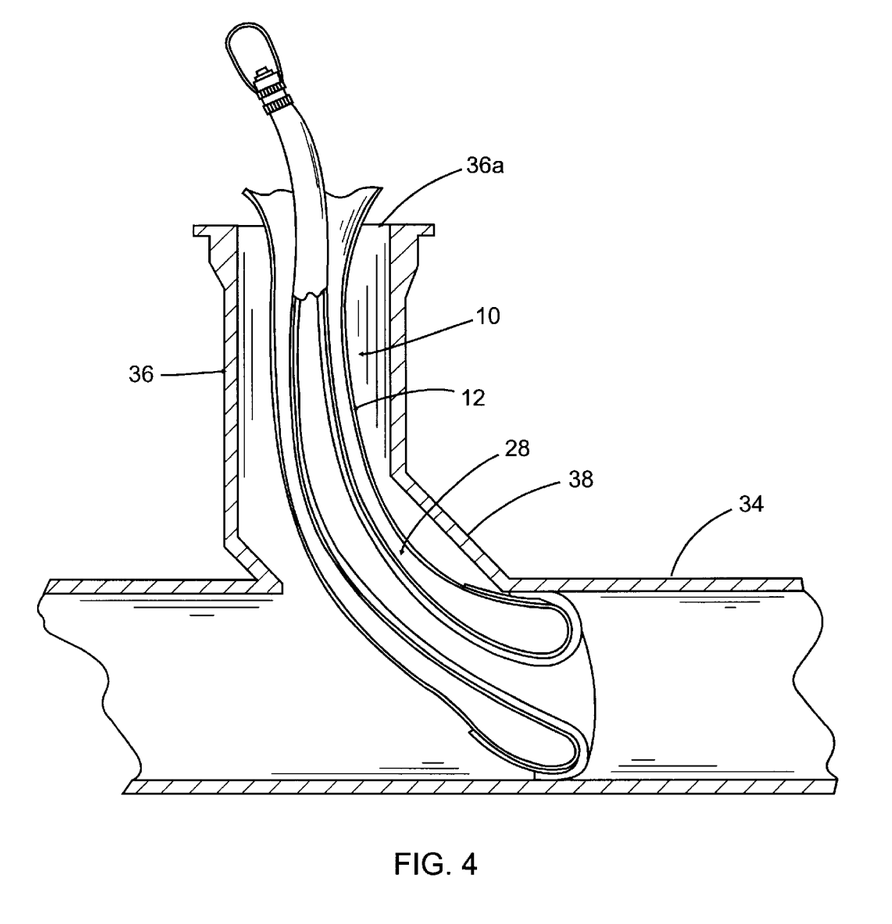
FIG. 4 is a vertical sectional view through a sewer pipe showing the manner in which the repair sleeve liner is installed in a lateral.

Referring now to FIG. 4, the method of use of the present invention is shown in more detail. The initial step in installing repair sleeve liner 26 within a lateral 34, or other similar pipe, includes providing a liner/bladder assembly 10 with liner 26 fully impregnated with resin, as described in detail in the co-pending '817 application. As shown in FIG. 4, a small diameter clean out 36 communicates with lateral 34 through a wye fitting 38. With this type of arrangement, it is not possible to begin the repair liner at the entrance 36a of clean out 36, since this would effectively block lateral 34 upstream of the wye fitting 38. With the liner/bladder assembly 10 of the present invention, it can be seen that the liner 26 may be positioned to begin after the wye fitting 38, and extend a predetermined distance along the lateral 34 to repair the pipe.

As shown in FIG. 1, attachment strips 30 are mounted to bladder tube 12 a predetermined distance from the end cap 40 at the forward end 16 of bladder tube 12, so as to position the leading end 26a of liner 26 at the appropriate position within the lateral pipe 34. For ease of description, the portion of bladder tube which is inverting will be identified as inversion end 12c, which continuously moves along the length of bladder tube 12 as the tube is inverted and reverted.

The initial step in repairing a lateral pipe 34 includes forming the liner/bladder assembly 10 with liner 26 attached via attachment strips 30 at a predetermined position spaced from end cap 40. The inverted end 12c of assembly 10 is then inserted within the entrance 36a of clean out 36, as shown in FIG. 4, and then air pressure, water pressure or other fluid pressure is applied within cavity 28. This causes bladder tube 12 to continue to invert until attachment strips 30 are inverted, which then causes liner 26 to invert, as shown in FIGS. 3 and 4. In this position, repair sleeve liner 26 is inverted to the outside of the bladder tube 12 in engagement with lateral pipe 34. The fluid pressure is continued, so as to continue the inversion of bladder tube 12, until the liner 26 completely contacts the portion of lateral pipe 34 which is to be repaired. Continuation of fluid pressure within bladder tube 12 then presses bladder tube 12 radially outwardly, so as to hold the liner 26 tightly against the interior surface of lateral 34.

Once the resin has cured and hardened, the fluid pressure is released from bladder tube 12, and control line 24 (shown in FIG. 1) is pulled to cause bladder 12 to resume its original uninverted configuration, thereby continuously "peeling" the bladder from liner 26 affixed in lateral pipeline 34. Once bladder tube 12 has been reverted back to the location of attachment strips 30, the stitches 32 forming the frangible connection of the strips to the liner are broken with a sharp tug on the bladder tube 12.

Figure 5:
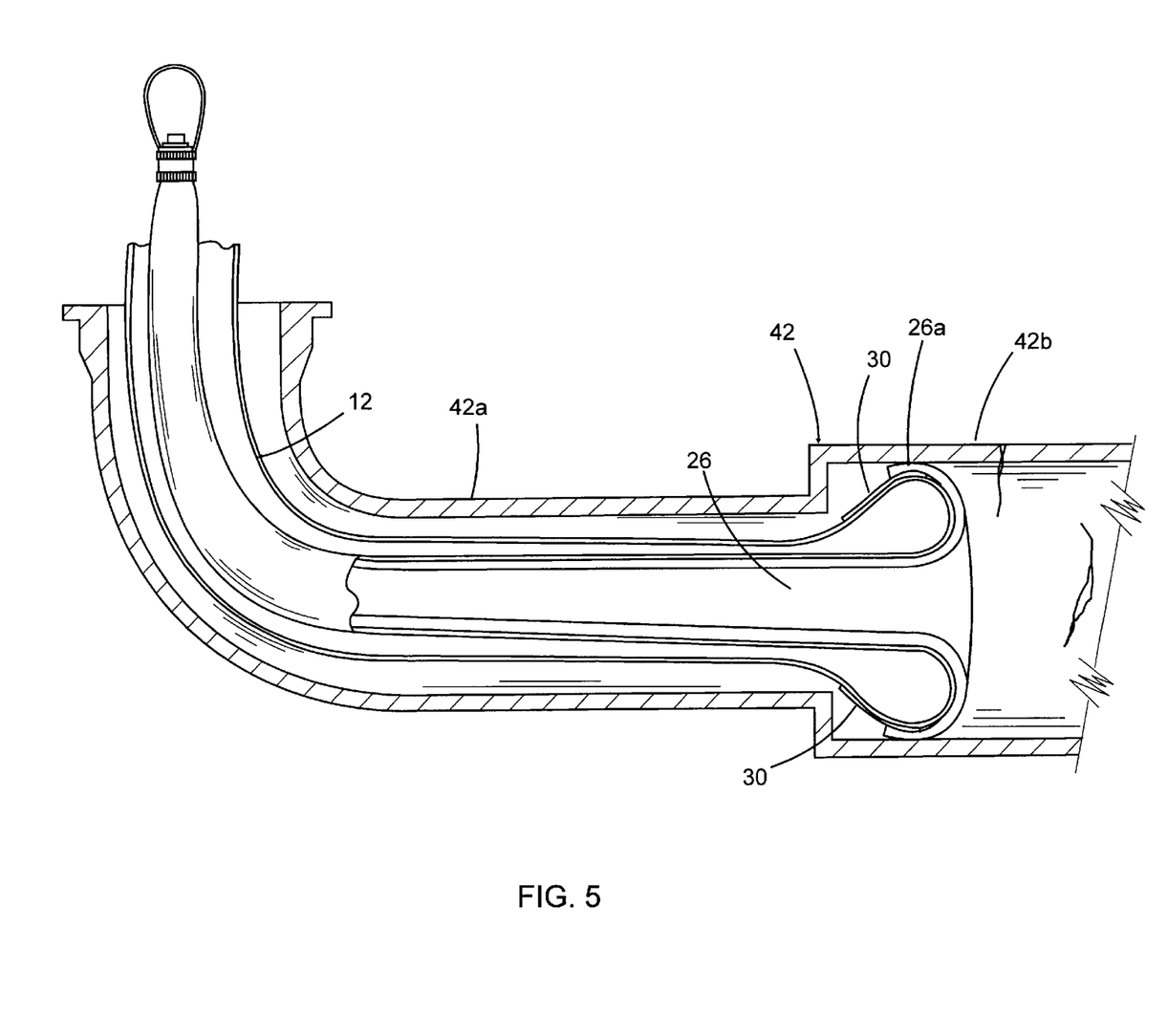
FIG. 5 is a sectional view similar to FIG. 4, showing installation of a sleeve liner in a large diameter pipe through a small diameter pipe.

Referring now to FIG. 5, a second use of the liner/bladder assembly 10 of the present invention permits installation of liner 26 within a pipe 42 which changes from a smaller diameter pipe 42a to a larger diameter pipe 42b. Rather than requiring a transition in the liner 26 from a smaller diameter to a larger diameter, attachment strips 30 are attached to bladder tube 12 at a predetermined location, and have a predetermined length so as to begin the leading end 26a of liner 26 at the beginning of the larger diameter pipe 42b.

Figure 6:
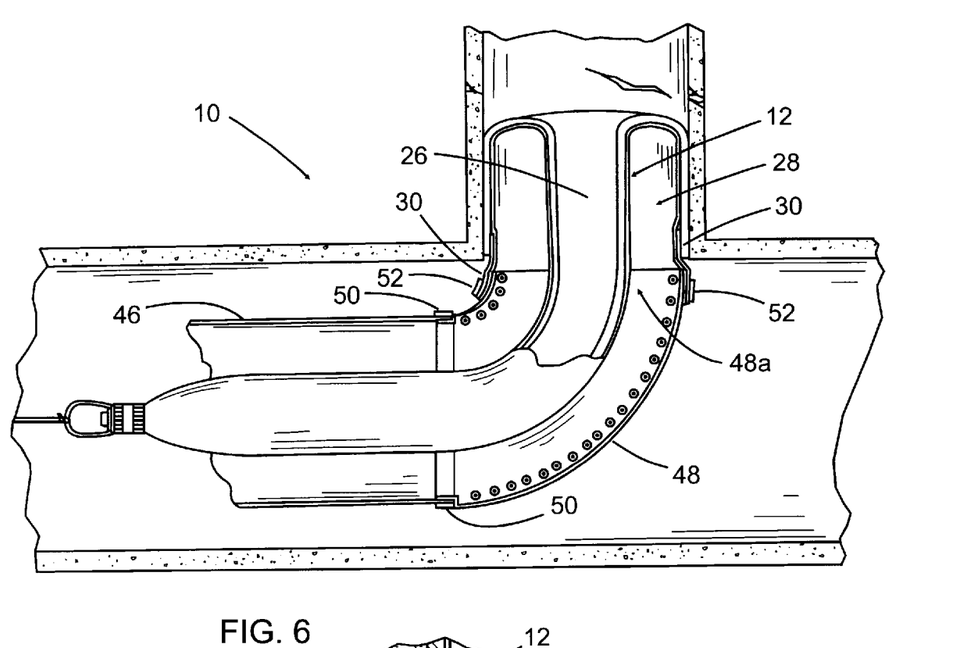
FIG. 6 is a sectional view through a tee in a pipeline showing installation of a sleeve liner in a lateral.
Figure 7:
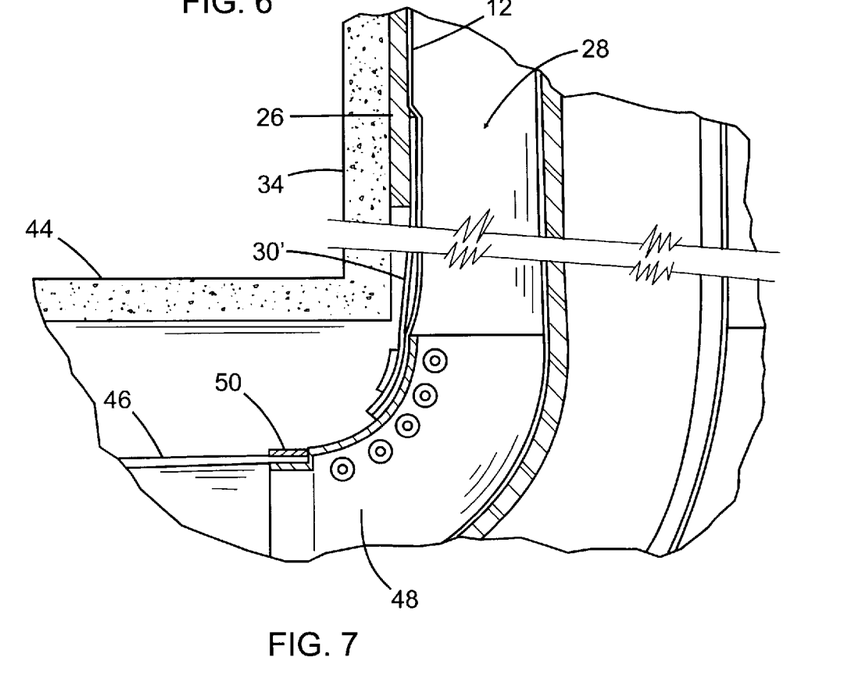
FIG. 7 is a view similar to FIG. 4, showing an enlarged view of a portion of a sleeve liner spaced a distance down the lateral.

FIGS. 6 and 7 disclose yet another use for liner/bladder assembly 10 with attachment strips 30 of selected length. FIG. 6 shows use of short length attachment strips 30, while FIG. 7 shows attachment strips 30' of a longer length, thereby shifting the location of the liner 26 within the lateral 34 off a main sewer line 44. In this embodiment of the invention, the forward end of the liner/bladder assembly 10 is journaled through a guide tube 46, which has an end cap for introducing a fluid at one end, and is attached to a 90° elbow 48 at the other end. A hose clamp 50 or other similar clamp may be used to attach guide tube 46 to elbow 48, to provide an airtight seal. Liner/bladder assembly 10 is then journaled through guide tube 46 and elbow 48 so as to project out the distal end 48a of elbow 48. Bladder tube 12 is then inverted or rolled inside out and affixed to the distal end 48a of elbow 48 with a clamp 52 to form an airtight seal.

Elbow 48 and guide tube 46 are then moved into the main sewer liner 44 in a conventional fashion, until elbow 48 is positioned adjacent the lateral 34 to be repaired. A mechanical robot of conventional construction is used to rotate elbow 48 to align distal end 48a with lateral 34. Fluid pressure is then introduced within guide tube 46, thence through elbow 48 so as to pressurize cavity 28 and invert bladder tube 12. As bladder tube 12 inverts, attachment strips 30 will cause liner 26 to invert and contact the interior surface of lateral 34. Once bladder tube 12 is fully inverted, pressure is maintained until the resin impregnated within liner 26 has cured and hardened. Control line 24 is then pulled to revert the bladder tube and peal it from the installed liner 26. The frangible stitches connecting attachment strips 30 to liner 26 are easily broken, to leave liner 26 firmly in place lining lateral 34, and permit removal of guide tube 46 and elbow 48 from main sewer line 44.

The length of adjustment straps 30 may be adjusted to more specifically locate the liner 26 within lateral 34. FIG. 7 shows attachment strips 30' of a greater length than shown in FIG. 6, such that liner 26 is positioned further into lateral 34, as desired.

The first embodiment of the invention, described above and shown in FIGS. 1–7 may be described as a "launcherless" style of liner/bladder assembly as opposed to the "launcher" style assembly described in the applicant's prior patent application Ser. No. 08/293,697, which is incorporated herein by reference thereto. The launcher style assembly includes a tubular outer cover which may be pulled through a main line sewer pipe so as to locate the liner/bladder assembly immediately adjacent the portion of the pipe to be repaired. The launcherless style described above is intended to be immediately inverted at the end of the pipe to be repaired and has a length to extend over the portion of the pipe to be repaired. No additional outer covering or "launcher" is needed because the inversion and lining process proceeds immediately from the location of the pipe entrance.

Large diameter pipe lines require a repair liner with a significant weight, and therefore the internal pressure required to invert the bladder is also much greater than for a smaller diameter laterals and the like. The applicant's current method for impregnating the repair liner with resin preferably includes the use of a translucent bladder so that the process of impregnating the liner within the bladder with resin may be observed to verify that the liner is thoroughly "wet out".

In the situation of large diameter pipe lines, the exterior bladder must be reinforced with other materials, such as fibers or the like, thereby significantly reducing the transluscent properties of the bladder, preventing observation of the impregnation process. The second embodiment of the invention, shown in FIGS. 8–10, overcomes these problems.

Figure 8:
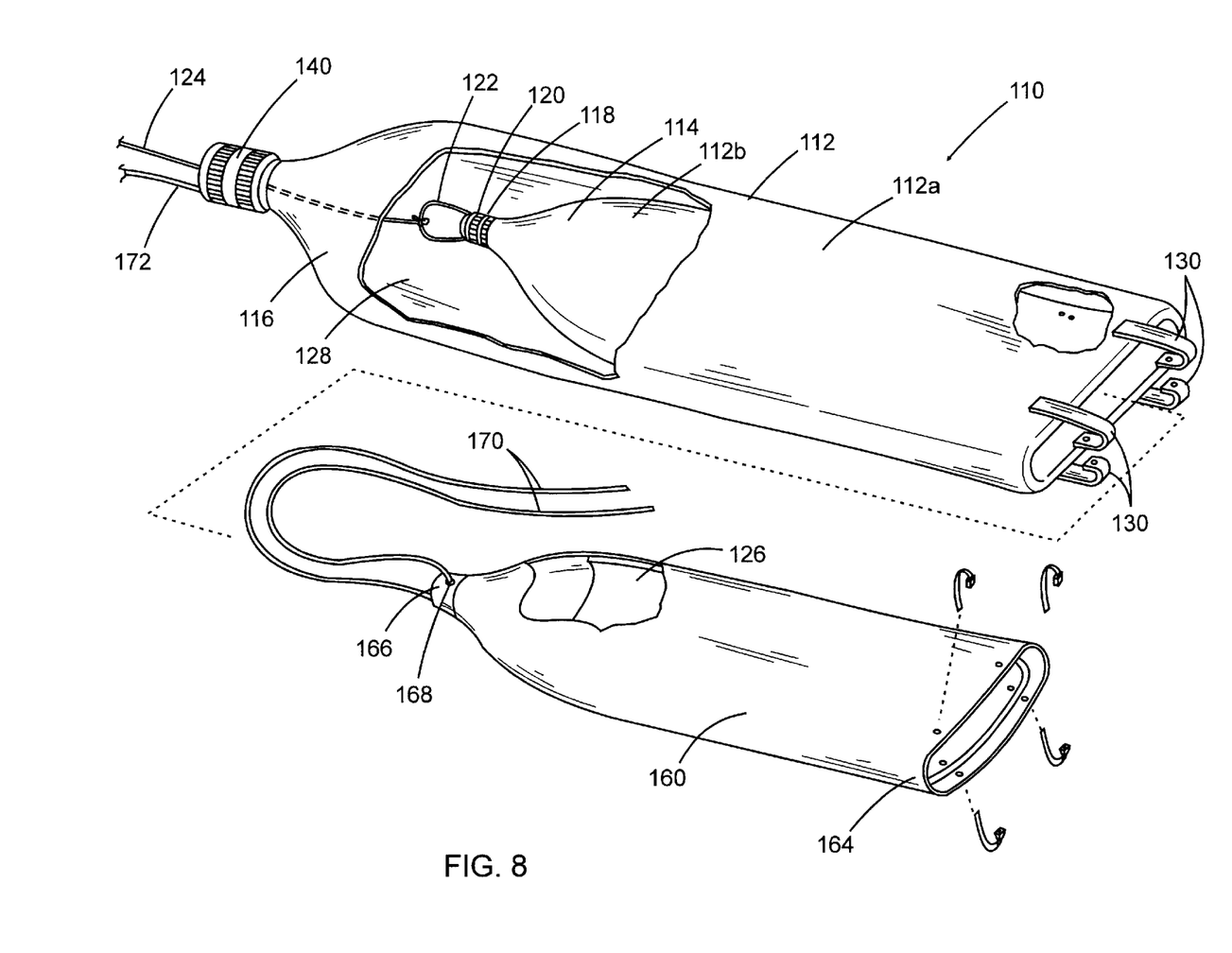
FIG. 8 is an exploded perspective view of a second embodiment of the liner bladder assembly of the present invention.

Referring now to FIG. 8, the second embodiment of the liner/bladder assembly is designated generally at 110, and includes a bladder tube 112 having a rearward end 114 and forward end 116, similar to the first embodiment of the invention. Bladder 112, however, is a larger diameter bladder with additional reinforcing material, and is therefore substantially opague, although much stronger than the first embodiment of the bladder 12. Bladder tube 112 is shown with the forward end 116 reversed and inverted over itself to form an inverted portion 112a with a cavity 128 within which the non-inverted portion 112b of bladder tube 112 is located.

A plurality of attachment strips 130 of the same material as bladder tube 112, with forward ends affixed to the interior surface of bladder tube 112 (shown on the exterior of inverted portion 112a in FIG. 8) by heat sealing, adhesive, or other permanent attachment means. The opposing ends of attachment strips 130 will be frangibly connected to the repair liner 126 and/or auxiliary bladder 160, as described in more detail hereinbelow.

In the second embodiment of the liner/bladder assembly 110, the repair sleeve liner 126, formed of felt or other resin absorbent material, is pulled within the interior of auxiliary bladder 160. Auxiliary bladder 160 is formed of a transluscent flexible rubber like material, and includes a forward end 162 and a rearward end 164, with an overall length greater than the length of liner 126. The method of impregnating liner 126 with resin is set forth in detail in the applicant's co-pending '817 application, referred to above. An end cap 166 is fastened to the forward end 162 of auxiliary bladder 160 and includes a pair of apertures 168 therein through which a cord 170 is threaded and doubled back upon itself. Once liner 126 has been impregnated with resin, cord 170 is used to pull the auxiliary bladder 160 (with liner 126 therein) within the non-inverted portion 112b of bladder tuber 112.

The two ends of cord 170 are threaded through the rearward end of bladder tube 112, and thence through the forward end 116 to permit the auxiliary bladder 160 to be pulled within the non-inverted portion 112b of bladder tube 112. One end of cord 170 is then released, and the other end pulled, to remove the cord from end cap 166 and auxiliary bladder 160. Once auxiliary bladder 160 is positioned within non-inverted portion 112b, a threaded receptacle 118 is fitted to the rearward end 114 of bladder tube 12, and held in place by clamps 120. A pulling loop 122 is also held by clamps 120 and is attached to control line 124. Steel end cap 140 is banded to the forward end 116 of bladder tube 112 to form an airtight fit. Apertures in the end cap permit control line 124 to be journaled therethrough, as well as an air supply line 172.

Figure 9:
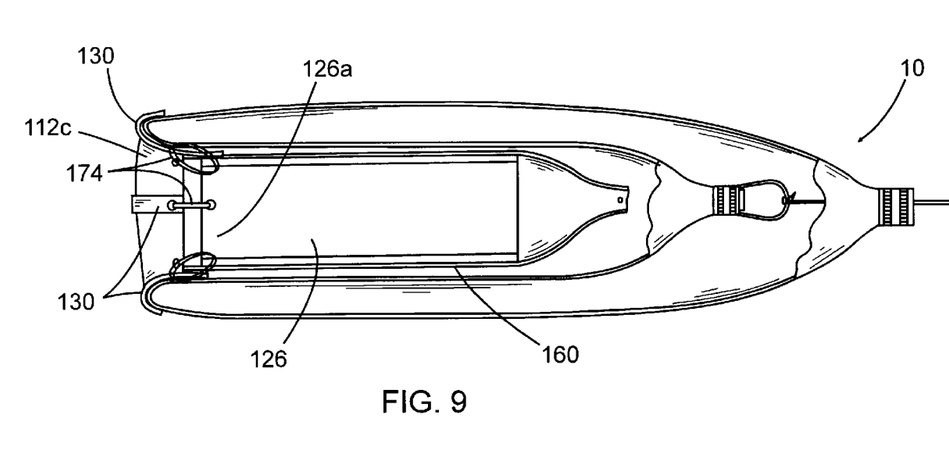
FIG. 9 is a vertical sectional view through the liner/bladder assembly showing a first step in installing the liner bladder assembly in a sewer pipe.

As shown in FIG. 9, the rearward end 164 of auxiliary bladder 160 and the leading end 126a of liner 126 are positioned proximal the bladder tube inversion end 112c. The free ends of attachment strips 130 are frangibly connected to either or both of liner 126 and auxililary bladder 160 using thin plastic tie strips, snaps, hook and loop fastener, or any other convenient connector which permits the connection to be broken with a sharp dynamic force. In FIG. 9, a plurality of plastic ties 174 are journaled through apertures in attachment strips 130 and apertures in the liner 126 and auxiliary bladder 160 and then looped and fastened in a conventional manner.

Figure 10:
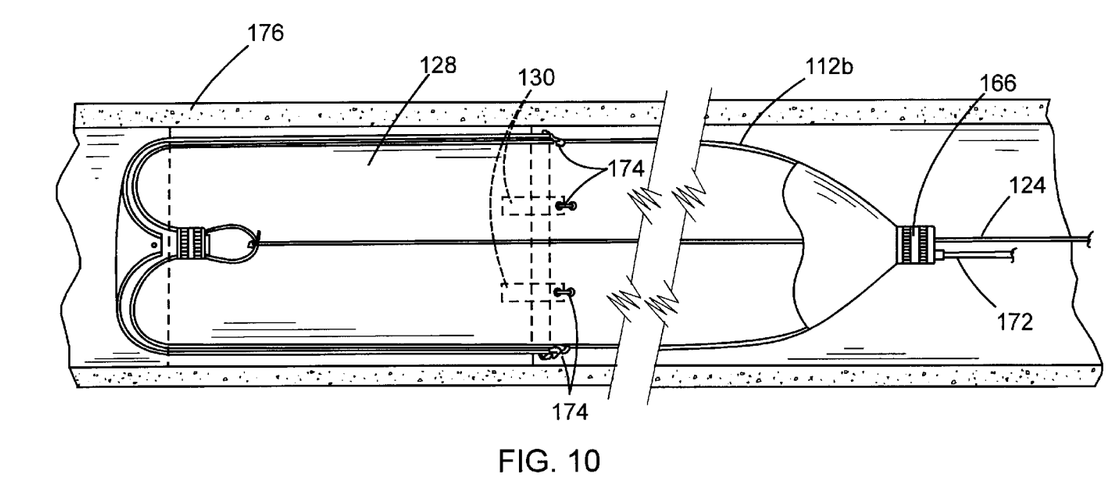
FIG. 10 is a sectional view showing installation of a sleeve liner in a large diameter sewer pipe.

Once the liner/bladder assembly 110 has been assembled, and attachment strips 130 connected to the liner 126 and auxiliary bladder 160, the liner bladder assembly 110 is positioned at the entrance, or within, the large diameter pipe line to be repaired as shown in FIG. 10. Fluid pressure is applied within cavity 128 through supply line 172 in end cap 166 to cause bladder tube 112 to invert within the pipe line 176. Attachment strips 130 will cause liner 126 and auxiliary bladder 160 to invert to the outer surface of the inverted portion of bladder tube 112 into contact with the interior surface of pipe line 176. The fluid pressure is continued until liner 126 completely contacts the portion of pipe 176 which is to be repaired. Continuation of fluid pressure within bladder tube 112 then presses bladder tube 112 radially outwardly, so as to hold liner 126 tightly against the interior surface of pipe line 176.

Whereas the invention has been shown and described in connection with the preferred embodiment thereof, many modifications, substitutions and additions may be made which are within the intended broad scope of the appended claims.

I claim:

1. Apparatus for repairing a pipeline, comprising:
   an elongated flexible tube member having a first end and a second end;
   said tube member inverted upon itself to create an outer inverted portion and an inner non-inverted portion, the inverted and non-inverted portions integrally connected at an inversion end, the inverted portion extending from the tube first end to the inversion end, and the non-inverted portion extending from the tube second end to the inversion end;
   an elongated sleeve liner of resin-absorbent material fitted within said non-inverted portion of the tube member, and generally concentric therewith;
   a plurality of spaced apart, generally parallel attachment strips attached at first ends to the tube member non-inverted portion, and frangibly attached at second ends to the liner, to cause the liner to invert outwardly onto an exterior surface of the inverted portion, as the tube member is inverted and the inversion end moves along the tube member towards the second end thereof.

2. The apparatus of claim 1, further comprising means for introducing fluid pressure into the inverted portion of the tube member on the exterior of the non-inverted portion, for causing the tube member to invert itself and extend forwardly away from the first end, whereby the liner will be completely inverted to the exterior surface of the inverted portion.

3. The apparatus of claim 2, wherein said attachment strips are elongated strips and are uniformly spaced around a circumference of the liner and tube member.

4. The apparatus of claim 3, wherein said attachment strips are permanently affixed to the tube member.

5. The apparatus of claim 4, wherein the frangible connection of each attachment strip to the liner includes a thread stitch which may be easily broken with a dynamic tension force.

6. The apparatus of claim 5, wherein said attachment strips are formed of a flexible material which is the same as the material of the tube member.

7. The apparatus of claim 1, wherein said attachment strips are elongated strips and are uniformly spaced around a circumference of the liner and tube member.

8. The apparatus of claim 7, wherein the frangible connection of each attachment strip to the liner includes a thread stitch which may be easily broken with a dynamic tension force.

9. The apparatus of claim 1, wherein the frangible connection of each attachment strip to the liner includes a thread stitch which may be easily broken with a dynamic tension force.

10. The apparatus of claim 1, wherein said attachment strips are formed of a flexible material which is the same as the material of the tube member.

11. Apparatus for repairing a pipeline, comprising:
    an elongated flexible tube member having a first end and a second end;
    said tube member inverted upon itself to create an outer inverted portion and an inner non-inverted portion, the inverted and non-inverted portions integrally connected at an inversion end, the inverted portion extending from the tube first end to the inversion end, and the non-inverted portion extending from the tube second end to the inversion end;
    a flexible resilient and translucent auxiliary tubular bladder fitted within the non-inverted portion of the tube member and generally concentric therewith;
    an elongated sleeve liner of resin impregnated material fitted within the auxiliary bladder and generally concentric therewith; and
    a plurality of spaced apart generally parallel attachment strips attached at first ends to the tube member non-inverted portion, and frangibly connected at second ends to the auxiliary bladder and liner, to cause the auxiliary bladder and liner to invert outwardly onto an exterior surface of the inverted portion as the tube member is inverted and the inversion end moves along the tube member towards the second end thereof.

12. A method for forming a liner/bladder assembly for repairing a pipeline, comprising the steps of:
    providing an elongated flexible bladder tube with an open forward end, a closed rearward end, and an interior surface;
    inverting the rearward end of the bladder tube over the forward end, to form an inverted portion extending from the rearward end to an inverted end, and a non-inverted portion within the inverted portion and extending from the inverted end to the forward end;
    inserting a sleeve-shaped liner of resin absorbent material into the flexible bladder tube in contact with the interior surface thereof, said liner having a forward end and rearward end;
    impregnating the liner with uncured resin material capable of curing and hardening;
    attaching rearward ends of a plurality of attachment strips to the interior surface of the bladder tube rearwardly of the liner;

frangibly connecting a forward end of the attachment strips to the rearward end of the liner;

said attachment strips being located a predetermined distance form the forward end of the tube, such that inversion of the tube from the rearward end forwardly will cause the liner to invert to an exterior surface of the tube member at a predetermined distance form the forward end of the tube member.

13. A method for forming a liner/bladder assembly for repairing a pipeline comprising the steps of:

providing an elongated flexible translucent auxiliary tubular bladder with forward and rearward ends and an interior surface;

inserting a sleeve-shaped liner of resin absorbent material into the auxiliary bladder in contact with the interior surface thereof, said liner having a forward and a rearward end, the rearward end positioned proximal the auxiliary bladder rearward end;

impregnating the liner with uncured resin material capable of curing and hardening;

viewing the step of impregnating the liner through the translucent auxiliary bladder to ensure complete and uniform impregnation of resin in the liner;

providing an elongated flexible bladder tube with a forward end, a rearward end, and an interior surface;

inverting the rearward end of the bladder tube over the forward end, to form an inverted portion extending from the rearward end to an inversion end, and a non-inverted portion within the inverted portion and extending from the inversion end to the forward end;

inserting the auxiliary bladder into the bladder tube non-inverted portion in contact with the interior surface of the bladder tube, with the auxiliary bladder rearward end position proximal the bladder tube inversion end;

attaching rearward ends of a plurality of attachment strips to the interior surface of the bladder tube, rearwardly of the liner;

frangibly connecting a forward end of the attachment strips to the rearward end of the liner; and said attachment strips being located a predetermine distance from the forward end of the tube, such that inversion of the tube from the rearward end forwardly will cause the liner and auxiliary bladder to invert to an exterior surface of the tube member at a predetermined distance from the forward end of the tube member.

14. Apparatus for repairing a pipeline, comprising:

an elongated flexible tube member having a first end and a second end;

said tube member inverted upon itself to create an outer inverted portion and an inner non-inverted portion, the inverted and non-inverted portions integrally connected at an inversion end, the inverted portion extending from the tube first end to the inversion end, and the non-inverted portion extending from the tube second end to the inversion end;

an elongated sleeve liner of resin-absorbent material fitted within said non-inverted portion of the tube member, and generally concentric therewith;

a plurality of spaced apart, generally parallel attachment strips attached at first ends to the tube member non-inverted portion, and frangibly attached at second ends to the liner, to cause the liner to invert outwardly onto an exterior surface of the inverted portion, as the tube member is inverted and the inversion end moves along the tube member towards the second end thereof;

a flexible resilient auxiliary tubular bladder interposed between the liner and the non-inverted portion of the tube member and generally concentric with both the liner and tube member;

wherein said attachment strip second ends are additionally frangibly attached to the auxiliary bladder, to cause the auxiliary bladder to invert outwardly onto an exterior surface of the tube member inverted portion as the tube member is inverted.

15. The apparatus of claim 14, wherein the auxiliary bladder is formed of translucent material.

* * * * *